Patented Aug. 26, 1930

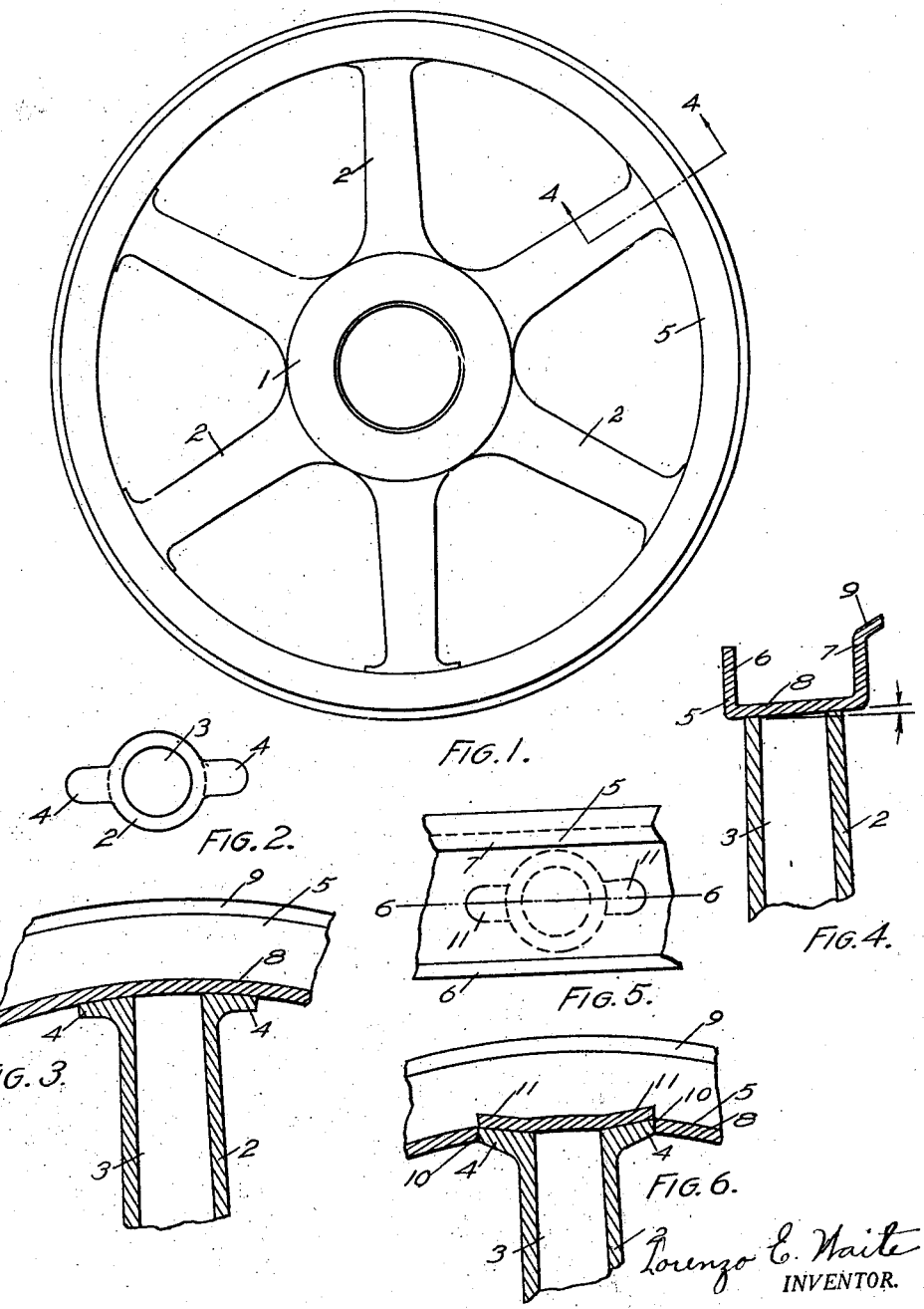

1,774,117

UNITED STATES PATENT OFFICE

LORENZO E. WAITE, OF ERIE, PENNSYLVANIA, ASSIGNOR TO ERIE MALLEABLE IRON COMPANY, OF ERIE, PENNSYLVANIA, A CORPORATION OF PENNSYLVANIA

WHEEL

Application filed January 3, 1928. Serial No. 244,110.

The present invention relates to wheels having spider-forming spokes usually of a malleable cast iron and a felloe formed of sheet metal. Such wheels present some advantages particularly as to lightness of construction. Some difficulties have been experienced in properly uniting the felloe with the spokes. The present invention is directed more particularly to the manner of connecting the spokes with the felloe. Features and details of the invention will appear from the specification and claims.

A preferred embodiment of the wheel forming the invention is illustrated in the accompanying drawings as follows:—

Fig. 1 shows a side elevation of a partially completed wheel.

Fig. 2 an end view of one of the spokes.

Fig. 3 a central section through a felloe and spoke prior to the attachment of the spoke to the felloe.

Fig 4 a section on the line 4—4 in Fig. 1.

Fig. 5 a plan view of a portion of a felloe immediately over a spoke.

Fig. 6 a section on the line 6—6 in Fig. 5.

The wheel spider comprises the hub 1 and spokes 2. The spokes are ordinarily provided with openings 3 to reduce the weight. The spokes are provided with ears 4 extending laterally from their ends. Preferably these are opposed and preferably extend circumferentially of the felloe.

A felloe 5 is preferably of channel shape having the sides 6 and 7 and the inner periphery, or base plate 8. One of the sides, usually has a beveled edge 9 for receivng a tire rim.

In assembling the wheel, the spider is placed within the felloe, the ends of the spokes engaging the inner periphery of the felloe. The ears are then forced outwardly into the felloe, the effect of which is to cut a lip 11 in the felloe and force the ears into an opening 10 thus formed. The edges of the walls of the openings have a contour exactly and intimately fitting the edges of the ears and the edges of the ears operating in connection with the walls of the opening lock the felloe against circumferential movement on the spokes, or disengagement sidewise—in fact, there is a very substantial assembly of the parts. Further the sinking of the edges of the ear into the felloe makes it possible to make a comparatively smooth joint between the ends of the spoke and the felloe.

What I claim as new is:—

1. In a wheel, the combination of a felloe; and spokes within the felloe each of said spokes having a laterally extending ear at its end extending into an opening in the felloe, said opening having a wall conforming to the edge of the ear.

2. In a wheel, the combination of a felloe; and spokes within the felloe each of said spokes having a laterally extending ear at its end extending into an opening in the felloe, said opening having an over-extending lip and a wall conforming to the edge of the ear.

3. In a wheel, the combination of a felloe; and spokes within the felloe each of said spokes having opposing laterally extending ears at its end extending into openings in the felloe, said openings having walls conforming to the edges of the ears.

In testimony whereof I have hereunto set my hand.

LORENZO E. WAITE.